United States Patent [19]

Heindl et al.

[11] Patent Number: 5,852,096
[45] Date of Patent: Dec. 22, 1998

[54] FILLER BASED ON SILICON DIOXIDE, METHOD FOR ITS PREPARATION, AND ITS USE

[75] Inventors: Detlef Heindl, Weinbach; Albert Erdrich, Bad Nauheim, both of Germany

[73] Assignee: Heraeus Kulzer GmbH, Hanau, Germany

[21] Appl. No.: 824,394

[22] Filed: Mar. 26, 1997

[30] Foreign Application Priority Data

Apr. 20, 1996 [DE] Germany ............ 196 15 763.3

[51] Int. Cl.$^6$ ........................................ C08K 3/00
[52] U.S. Cl. .................. 524/492; 524/493; 524/494; 523/115; 523/217; 523/116; 523/117; 501/39
[58] Field of Search ................ 524/492, 493, 524/494; 523/217, 115, 116, 117; 501/39

[56] References Cited

U.S. PATENT DOCUMENTS

| | | | |
|---|---|---|---|
| 3,066,112 | 11/1962 | Bowen | 260/41 |
| 3,539,533 | 11/1970 | Lee et al. | 260/47 |
| 4,029,632 | 6/1977 | Gross et al. | 260/42.15 |
| 4,052,010 | 10/1977 | Baker et al. | 241/20 |
| 4,215,033 | 7/1980 | Bowen | 260/42.15 |
| 4,217,264 | 8/1980 | Mabie et al. | 260/42.15 |
| 4,267,097 | 5/1981 | Michl et al. | 260/42.15 |
| 4,608,357 | 8/1986 | Silverman et al. | 502/84 |
| 4,649,165 | 3/1987 | Kuhlmann | 523/116 |

FOREIGN PATENT DOCUMENTS

| | | |
|---|---|---|
| 0 048 681 B1 | 3/1982 | European Pat. Off. . |
| 0 172 513 B1 | 2/1986 | European Pat. Off. . |
| 0 382 033 A2 | 8/1990 | European Pat. Off. . |
| 24 03 211 C3 | 7/1975 | Germany . |
| 24 05 578 C3 | 8/1975 | Germany . |
| 34 03 040 A1 | 8/1985 | Germany . |
| 250 310 A1 | 10/1987 | Germany . |
| 195 24 362 A1 | 1/1996 | Germany . |
| 60-200843 | of 1984 | Japan . |
| 1 408 265 | 10/1975 | United Kingdom . |
| 2 038 303 | 7/1980 | United Kingdom . |
| 2 291 053 | 1/1996 | United Kingdom . |

OTHER PUBLICATIONS

Schweiz Monatsschr Zahnmed. vol 100:Aug. 1990, pp. 953–960.
Chemical Abstract of JP 60200843, vol. 104, No. 134 735.

*Primary Examiner*—Edward J. Cain
*Attorney, Agent, or Firm*—Sprung Kramer Schaefer & Briscoe

[57] ABSTRACT

Porous silicon dioxide glass is proposed as an inorganic filler for polymerizable materials, which has a particle size of 0.5–50 micrometers, a pore size of 20–120 nanometers, a pore volume of 200–1000 mm$^3$/g and a BET surface area of 10–100 m$^2$/g. The polymer products containing the filler are characterized by a very good resistance to abrasion.

19 Claims, No Drawings

FILLER BASED ON SILICON DIOXIDE, METHOD FOR ITS PREPARATION, AND ITS USE

The invention relates to a finely divided filler based on silicon dioxide, a method for its preparation, and its use in polymerizable materials. The invention relates especially to a finely divided filler based on silicon dioxide for dental materials which can be cured by polymerization, preferably those for making dental fillings.

In the field of dental filling materials which can be cured by polymerization a great advance was achieved when Rafael L. Bowen introduced long-chain monomeric dimethacrylates—reaction products of bisphenol A and its derivatives with glycidyl methacrylate, especially the so-called bis-GMA—and fine quartz glass powder to strengthen the resin matrix (U.S. Pat. No. 3,066,112 A), instead of the methylmethacrylate used in them up to that time.

Another example of a dental material containing a finely divided inorganic filler in addition to organic monomers is described in U.S. Pat. No. 3,539,533 A. The polymerizable binding agent is a mixture of bis-GMA, bisphenol A-dimethacrylate, a diluent monomer, especially triethyleneglycol dimethacrylate, and in some cases small amounts of methacrylic acid. This mixture is used together with about 65–75 weight-% of the inorganic filler—for example, silicon dioxide, glass, aluminum oxide or quartz. The inorganic filler can have a particle size of about 2–85 micrometers; to improve the resin/filler bond it is pretreated with a silane, e.g., 3-methacryloyloxypropyl trimethoxysilane.

DE 24 03 211 C3 discloses a material for dental purposes (fillings for cavities, materials for cements, sealing and protective coating compositions, crown and bridge materials, prosthesis materials, compositions for making artificial teeth), which, in addition to polymerizable acrylate or methacrylate contains as inorganic filler a microfine (highly dispersed) silicon dioxide with a particle size of about 0.01–0.4 micrometer and a BET surface area of less than about 200 m$^2$/g. The polymerizable monomer in that case consists of bis-GMA or another derivative of bisphenol A or a reaction product of hydroxyalkyl methacrylates and diisocyanates, together in some cases with monomeric short-chain methacrylates and/or diacrylates or dimethacrylates. The tooth fillings and the like, made from the material containing the microfine filler, are characterized by their ability to take a high polish and by a translucence similar to the translucence of natural teeth.

A further step in the development of dental materials based on a resin are the so-called hybrid materials which contain both microfine fillers and conventional fillers (macrofillers). A dental material of this kind is disclosed for example in DE 24 05 578 C3. It contains 30–80 weight-% of a mixture of amorphous silica (pyrogenic silicon dioxide) made by flame hydrolysis and having a maximum particle size of 0.07 micrometer and finely divided glass, preferably borosilicate glass, glass containing barium oxide or lanthanum oxide, or lithium aluminum silicate glass, with a particle size up to 5 micrometers.

The dental filling material described in DE 34 03 040 A1 contains 60–90 weight-% of a filler mixture of 5–20 weight-% of an X-ray opaque filler with a grain size distribution between 0.5 and 40 micrometers, 20–35 weight-% of an X-ray opaque filler with a grain size distribution between 0.2 and 15 micrometers, and 45–75 weight-% of a silicon dioxide microfiller with a grain size distribution between 5 and 150 nanometers.

An additional example of a hybrid material is the dental composition described in EPO 382 033 A2, which in addition to polymerizable acrylates or methacrylates and a catalyst for photopolymerization (photoactivator) contains 5–80 weight-% of a silanized glass or a silanized glass ceramic with an average particle size between 0.1 and 10 micrometers, and 2–10 weight-% of a surface-treated microfiller.

The inorganic fillers used for strengthening dental materials based on a resin usually have a surface treated with a silane, e.g., 3-methacryloyloxypropyl trimethoxysilane, which improves compatibility with the organic components (DE 34 03 040 A1) and a chemical adhesion between the filler and the resin matrix. A further improvement of the filler-to-resin bond can be achieved when, in addition to the chemical adhesion, a possibility for physical adhesion exists. A physical adhesion can be achieved, for example, according to a proposal in U.S. Pat. No. 4,215,033 A, by the use of a semiporous filler obtained by etching a two-phase glass. The depth of the pores present at the surface amounts to 10 to 10,000 Ångstroms.

Dental material containing porous fillers are also disclosed for example in U.S. Pat. No. 4,217,264 A, EP0 048 681 B1 and EP0 172 513B1.

The polymerizable material described in U.S. Pat. No. 4,217,264 A contains, in addition to monomeric methacrylic acid esters and a catalyst for the polymerization, a microporous ("internally microporous") vitreous filler which is made by calcining inorganic oxide solutions, especially those of silicon dioxide, aluminum oxide and at least one X-ray opaque oxide (zirconium, hafnium, tantalum and tin oxide). The filler can consist of 27–57 weight-% of silicon dioxide.

EP 0 048 681 B1 relates to a method for preparing a composite of organic resin and inorganic porous particles by impregnating the porous inorganic particles with at least partially curable resin material, compressing them so that the particles touch one another and the pressure in the resin is compensated by the plastic flow of the excess resin through the pores of the inorganic particles, and cementing the particles together by curing at least a part of the curable resin material. A resin structure is thus formed with an adjoining inorganic phase. The composite is suitable preferably for use as a dental material, including filling and overlay material, binding agent, material for crowns and bridges, and material for artificial plates and teeth.

In EP 0172 513 B1, polymerizable dental compositions are described which contain 10 to 60 weight-% of a microporous filler of silicon dioxide, aluminum oxide or calcium silicate in addition to 20–65 weight-% of polymerizable monomers. The microporous filler has an average particle size of 0.5 to 50 micrometers, a BET surface area of at least 200 m$^2$/g, a pore volume of 0.7 to 5 ml/g and a pore diameter of 10 to 50 nanometers and can be silanized. The dental compositions can be used, for example, for dental restoration and repair work, as crown and bridge material, and for making artificial teeth.

DE 195 24 362 A1 relates to an inorganic composition and a dental composite material containing this composition for restorative purposes. The inorganic composition contains (A) 60 to 99 weight-% of spherical oxide particles with an average particle diameter of more than 0.1 micrometer, but not more than 1 micrometer, and (B) 1 to 40 weight-% of fine oxide particles with an average particle diameter of not more than 0.1 micrometer, the volume of micropores amounting to not more than 0.1 cm$^3$ per gram of the inorganic composition, on account of greatly aggregated particles with pore diameters not under 0.08 micrometers. Preferred examples of the spherical oxide particles are amorphous silicon dioxide, silicon dioxide-zirconium dioxide, silicon dioxide-titanium oxide, quartz, aluminum oxide, and the like. The spherical oxide particles are generally produced by hydrolyzing a metal oxide. After drying they are often fired at 500° to 1000° C. in order to reduce the percentage of silanol groups on the surfaces. Examples of the fine inorganic oxide particles are pyrogenic silicon dioxide, pyrogenic aluminum oxide, pyrogenic zirconium oxide, amorphous silicon dioxide, quartz, aluminum oxide, and the like. The inorganic composition has a surface treated with a silane. The products obtained from the composite material after curing are characterized by good mechanical properties, smooth surface and only very little wear on the dental antagonist.

The subject of the invention is a finely divided filler based on silicon dioxide, which is characterized in that it consists of porous silicon dioxide glass and has a particle size of 0.5–50 micrometers, a pore size of 20–120 nanometers, a pore volume of 200–1000 mm$^3$/g and a BET surface area of 10–100 m$^2$/g.

Preferably the porous silicon dioxide glass has a particle size of 0.5–20 micrometers, a pore size of 90–100 nanometers, a pore volume of 800–900 mm$^3$/g and a BET surface area of 20–40 m$^2$/g.

The porous silicon dioxide glass can be prepared by applying the method described in DD 350 310 A1 and then grinding, for example in a ball mill with zirconium oxide grinding balls, and sorting, for example by winnowing.

The porous silicon dioxide glass has proven especially desirable when it is in silanized form, i.e., treated with a silane; 3-methacryloyloxypropyl trimethoxysilane has been found especially suitable.

An especially desirable embodiment of the invention is created when the porous silicon dioxide glass is provided with an impregnant which contains one or more monomeric acrylic acid esters methacrylic acid esters or a mixture thereof—hereinafter called (meth)acrylic acid esters.

The impregnated silicon dioxide glass can be prepared by treating the porous silicon dioxide glass with an impregnant containing a monomeric (meth)acrylic acid ester. For this purpose the porous glass and the impregnant are thoroughly mixed together, preferably at elevated temperature. The mixture is then subjected to a treatment under reduced pressure, preferably also at elevated temperature.

The amount of the impregnant used for the treatment depends both on the pore volume of the silicon dioxide glass and on the purpose for which the impregnated silicon dioxide glass is to be used, and can be determined by experiment.

If the impregnated silicon dioxide glass is to be used in a dry form, it is recommended, in the case of a pore volume of for example 1000 mm$^3$/g in the silicon dioxide glass, to use approximately equal amounts of glass and impregnant.

The monomeric (meth)acrylic acid esters can be monomeric mono-, di- and poly(meth)acrylates. If the silicon dioxide glass is used as filler in polymerizable dental materials, the (meth)acrylic acid esters are selected from among the (meth)acrylic acid esters known and proven for such materials. Preferred monomers are:

Hydroxyethyl methacrylate
Hydroxypropyl methacrylate
Triethyleneglycol monoethylether monomethacrylate
Diurethane di(meth)acrylate from 2,2,4-trimethylhexamethylene diisocyanate and 2-hydroxyethyl (methacrylate)
Diurethane di(meth)acrulate from bis-(diisocyanatomethyl)-tricyclodecane and 2-hydroxyethyl (meth)acrylate
Decanediol di(meth)acrylate
Dodecanediol di(meth)acrylate
Triethyleneglycol di(meth)acrylate
Bis-[4-(2-hydroxy-3-methacryloyloxypropoxy)-phenyl] dimethylmethane
Bis-[4-(2-hydroxy-3-acryloyloxypropoxy)-pheyl] dimethylmethane
Tri(meth)acryloyloxyethoxytrimethylol propane
Tetra(meth)acryloyloxyethoxy pentaerythritol
Tetra(meth)acryloyloxyisopropoxy pentaerythritol and
Hexa(meth)acryloyloxyethoxy dipentaerythritol.

It has been found especially desirable if the impregnants contain polymerization catalysts in addition to the monomeric (meth)acrylic acid esters of appropriate viscosity. The polymerization catalysts can be catalysts for heat polymerization, cold polymerization or photopolymerization. Suitable catalysts for heat polymerization are, for example, organic peroxides such as dibenzoyl peroxide, redox systems for cold polymerization, preferably those consisting of organic peroxides and amines, and for photopolymerization, ketone/amine systems, such as those disclosed in GB 1 408 265 B1, camphorquinone/amine, for example.

Impregnants containing a catalyst for photopolymerization are preferred, also on account of the possibility of single-component formulation. The impregnant or the substance for its preparation will then contain 0.1 to 0.5 weight-%, preferably 0.1–0.3 weight-%, of a ketone/amine system, in which case N,N-dimethyl-p-toluidine, N,N-bis-(2-hydroxyethyl)-p-toluidine and esters of 4-dimethylaminobenzoic acid such as the ethyl and the butoxy ethyl ester have proven especially valuable. A benzil acetal can be present as an additional photoactive component, preferably in an amount of 0.02–0.1 weight-%.

The impregnant preferably also contains a silane, especially 3-methacryloyloxypropyl trimethoxysilane. A silane content of 1–8 weight-% in the impregnation and in the impregnant, respectively, has proven valuable.

The silicon dioxide glass according to the invention is well suited for use as filler in polymerizable materials. Surprisingly, the resins fortified with the silicon dioxide glass are characterized by very good abrasion resistance (wear resistance). Polymerization shrinkage is slight.

For further explanation, the preparation of a silicon dioxide glass is described in the following example, which is impregnated with monomeric (meth)acrylic acid esters, a catalyst system for photopolymerization, and a silane. The shrinkage of the impregnated silicon dioxide glass during polymerization and the abrasion resistance of test specimens obtained by polymerization from the silicon dioxide glass impregnated with the monomeric (meth)acrylic acid esters are determined and compared with corresponding properties of a regular commercial composite (Charisma®, registered trademark of Heraeus Kulzer GmbH), Germany and of the test specimens prepared therefrom.

EXAMPLE

Impregnated silicon dioxide glass
Starting products

A) Porous silicon dioxide glass
  Pore size: 90–100 nanometers
  Average particle size: 8 micrometers
  Pore volume: 880 mm$^3$/g
  BET surface area: 30 m$^2$/g B) Impregnant fluid composed of:
- 41.24 g tetraacryloyloxyisopropoxy pentaerythritol
- 31.08 g bis-[4-(2-hydroxy-3-acryloyloxypropoxy)-phenyl]dimethylmethane
- 7.77 g hydroxypropyl methacrylate
- 6.0 g triethyleneglycol monoethylether monomethylacrylate
- 0.39 g benzildimethyl acetal
- 0.16 g camphorquinone
- 0.23 g 4-dimethylaminobenzoicacid-(2-butoxyethyl) ester
- 5.5 g 3-methacryloyloxypropyl trimethoxysilane The impregnant is heated to 70° C. and 90 g of the porous silicon dioxide glass is added. The mixture obtained is stirred for 20 minutes until the impregnant has uniformly wetted the glass. The mixture is then exposed for 20 minutes to a reduced pressure ($10^{-1}$ to $10^{-2}$ Torr, $1,3332 \cdot 10^{-2}$ MPa to $1,3332 \cdot 10^{-3}$ MPa); the temperature is maintained at 70° C. After cooling to room temperature, impregnated silicon dioxide glass is obtained in the form of a white, opaque mass.

To determine the polymerization shrinkage, test specimens with a diameter of 15 mm and a thickness of 1 mm are prepared from the impregnated silicon dioxide glass. A laser beam is focused onto the surface of the specimen, simultaneously the opposite side of the specimen is irradiated with a photopolymerization apparatus (Translux EC of Heraeus Kulzer GmbH, Germany). Due to the shrinkage produced by polymerization the laser beam has to be corrected in order to remain focused. The difference between the different focusings is a measure of the polymerization shrinkage of the specimens.

Abrasion resistance is determined by measuring wear with the mastication simulator described in Schweiz. Monatsschr. Zahnmed. Vol. 100 (1990), 953–960. For the wear measurements, test specimens with a diameter of 10 mm and a thickness of 2 mm were made by irradiation with the photopolymerization apparatus for 180 seconds and polishing with silicon carbide abrasive paper, and a small ceramic rod was used as a confronting dummy tooth.

The polymerization shrinkage and abrasion resistance are listed in the table.

TABLE

| Test specimen | Polymerization shrinkage [μm] | Abrasion Resistance [μm] |
| --- | --- | --- |
| Example | 7 | 25–40 |
| Composite (comparison) | 14 | 90–100 |

We claim:

1. Finely divided filler on a silicon dioxide basis comprising porous silicon dioxide glass having a particle size of 0.5–50 micrometers, a pore size of 20–120 nanometers, a pore volume of 200–1000 mm$^3$/g and a BET surface area of 10–100 m$^2$/g wherein the porous silicon dioxide glass is provided with an impregnant containing monomeric (meth)acrylic acid esters.

2. Filler according to claim 1, wherein the porous silicon dioxide glass has a particle size of 0.5–20 micrometers, a pore size of 90–100 nanometers, a pore volume of 800–900 mm$^3$/g and a BET surface area of 20–40 m$^2$/g.

3. Filler according to claim 1, wherein the impregnant additionally contains a catalyst for photopolymerization.

4. Filler according to claim 3, wherein the catalyst for the photopolymerization is a camphorquinone/amine system.

5. Filler according to claim 1, wherein the impregnant additionally contains a silane.

6. Filler according to claim 5, wherein the silane is 3-methacryloyloxypropyl trimethoxysilane.

7. Method for preparing a filler according to claim 1, wherein the porous silicon dioxide glass is treated with an impregnant containing monomeric (meth)acrylic acid esters.

8. Method according to claim 6, wherein the impregnant additionally contains a catalyst for photopolymerization.

9. Method according to claim 7, wherein the catalyst for photopolymerization is a camphorquinone/amine system.

10. Method according to claim 6, wherein the impregnant additionally contains a silane.

11. Method according to claim 9, wherein the silane is 3-methacryloyloxypropyl trimethoxy silane.

12. Method of preparing polymerizable materials comprising using as a filler therein, a finely divided filler on a silicon dioxide basis comprising porous silicon dioxide glass having a particle size of 0.5–50 micrometers, a pore size of 20–120 nanometers, a pore volume of 200–1000 mm$^3$/g and a BET surface area of 10–100 m$^2$/g.

13. A polymerizable material comprising as a filler therein a finely divided filler on a silicon dioxide basis comprising porous silicon dioxide glass having a particle size of 0.5–50 micrometers, a pore size of 20–120 nanometers, a pore volume of 200–1000 mm$^3$/g and a BET surface area of 10–100 m$^2$/g.

14. A method according to claim 13, wherein the porous silicon dioxide glass has a particle size of 0.5–20 micrometers, a pore size of 90–100 nanometers, a pore volume of 800–900 mm$^3$/g and a BET surface area of 20–40 m$^2$/g.

15. A method according to claim 13, wherein the porous silicon dioxide glass is silanized.

16. A method according to claim 13, wherein the porous silicon dioxide glass is provided with an impregnant containing monomeric (meth)acrylic acid esters.

17. A polymerizable material according to claim 14, wherein the porous silicon dioxide glass has a particle size of 0.5–20 micrometers, a pore size of 90–100 nanometers, a pore volume of 800–900 mm$^3$/g and a BET surface area of 20–40 m$^2$/g.

18. A polymerizable material according to claim 14, wherein the porous silicon dioxide glass is silanized.

19. A method according to claim 14, wherein the porous silicon dioxide glass is provided with an impregnant containing monomeric (meth)acrylic acid esters.

* * * * *

UNITED STATES PATENT AND TRADEMARK OFFICE
CERTIFICATE OF CORRECTION

PATENT NO. : 5,852,096
DATED : December 22, 1998
INVENTOR(S) : Heindel et al.

It is certified that error appears in the above-identified patent and that said Letters Patent is hereby corrected as shown below:

| | |
|---|---|
| Col. 6, Line 17 | Delete "6" and substitute --7-- |
| Col. 6, Line 19 | Delete "7" and substitute --8-- |
| Col. 6, Line 21 | Delete "6" and substitute --7-- |
| Col. 6, Line 23 | Delete "9" and substitute --10-- |
| Col. 6, Line 38 | Delete "13" and substitute --12-- |
| Col. 6, Line 43 | Delete "13" and substitute --12-- |
| Col. 6, Line 45 | Delete "13" and substitute --12-- |
| Col. 6, Line 48 | Delete "14" and substitute --13-- |
| Col. 6, Line 53 | Delete "14" and substitute --13-- |
| Col. 6, Line 55 | Delete "14" and substitute --13-- |

Signed and Sealed this

Seventh Day of December, 1999

Attest:

Q. TODD DICKINSON

*Attesting Officer*     Acting Commissioner of Patents and Trademarks